United States Patent
Gwak et al.

(10) Patent No.: US 12,256,789 B2
(45) Date of Patent: Mar. 25, 2025

(54) TACTILE STIMULUS PROVIDING APPARATUS

(71) Applicant: BHAPTICS INC., Daejeon (KR)

(72) Inventors: Ki Uk Gwak, Daejeon (KR); Young Joo Jo, Seoul (KR)

(73) Assignee: BHAPTICS INC., Daejeon (KR)

( * ) Notice: Subject to any disclaimer, the term of this patent is extended or adjusted under 35 U.S.C. 154(b) by 4 days.

(21) Appl. No.: 18/256,151

(22) PCT Filed: Dec. 9, 2021

(86) PCT No.: PCT/KR2021/018596
§ 371 (c)(1),
(2) Date: Jun. 6, 2023

(87) PCT Pub. No.: WO2022/124806
PCT Pub. Date: Jun. 16, 2022

(65) Prior Publication Data
US 2024/0032617 A1    Feb. 1, 2024

(30) Foreign Application Priority Data
Dec. 11, 2020    (KR) .................. 10-2020-0173698

(51) Int. Cl.
*A41D 1/00* (2018.01)
*A41D 1/04* (2006.01)
*G08B 6/00* (2006.01)

(52) U.S. Cl.
CPC ............... *A41D 1/005* (2013.01); *A41D 1/04* (2013.01); *G08B 6/00* (2013.01); *A41D 2300/322* (2013.01)

(58) Field of Classification Search
CPC ........ A44B 19/38; A41D 1/002; A41D 1/005; A41D 1/04; A41D 13/0568
See application file for complete search history.

(56) References Cited

U.S. PATENT DOCUMENTS

| | | | |
|---|---|---|---|
| 1,174,976 A | * | 3/1916 | Gaines ..................... A41D 1/21 2/221 |
| 3,112,545 A | | 12/1963 | Williams |

(Continued)

FOREIGN PATENT DOCUMENTS

| | | |
|---|---|---|
| EP | 3501321 A1 | 6/2019 |
| KR | 10-2009-0088917 A | 8/2009 |

(Continued)

OTHER PUBLICATIONS

TactSuit X Series Haptic Vests, ROADTOVR, Nov. 9, 2020 URL: https://www.roadtovr.com/bhaptics-tactsuit-x-series-vest-pre-order-release.

(Continued)

*Primary Examiner* — Patrick J. Lynch
(74) *Attorney, Agent, or Firm* — Innovation Counsel LLP

(57) ABSTRACT

A tactile stimulus providing apparatus according to one embodiment of the present invention is a tactile stimulus providing apparatus in the form of a vest and includes a first front panel including first actuators arranged between one side and the other side, a second front panel including second actuators arranged between one side and the other side, and a rear panel including third actuators and connected to the first front panel and the second front panel, wherein the first front panel further includes a first recess formed to extend along the one side, and the second front panel further includes a second recess formed to extend along the one side.

9 Claims, 17 Drawing Sheets

(56) References Cited

U.S. PATENT DOCUMENTS

| | | | | |
|---|---|---|---|---|
| 3,526,221 | A * | 9/1970 | Garber | A41D 13/0506 128/95.1 |
| 4,608,716 | A * | 9/1986 | Brumfield | A41D 13/0568 2/403 |
| 5,033,125 | A * | 7/1991 | de la Villefromoy | A41F 9/025 2/221 |
| 5,584,072 | A * | 12/1996 | Kim | A61F 13/06 2/22 |
| 7,967,679 | B2 * | 6/2011 | Ombrellaro | F41H 1/02 463/47 |
| 10,219,552 | B2 * | 3/2019 | Castellano | A41D 27/085 |
| 2007/0234467 | A1 * | 10/2007 | Leach | A41D 13/0525 2/227 |
| 2008/0153590 | A1 | 6/2008 | Ombrellaro et al. | |
| 2010/0269312 | A1 * | 10/2010 | Wagner | A41H 37/003 24/301 |
| 2012/0190460 | A1 * | 7/2012 | Sessions | A63F 13/212 463/47 |
| 2013/0276218 | A1 * | 10/2013 | Parisi, Jr. | A41D 13/0568 2/463 |
| 2014/0115755 | A1 * | 5/2014 | Mahar | A41F 9/025 2/336 |
| 2015/0123774 | A1 | 5/2015 | Ioffreda et al. | |
| 2015/0289606 | A1 * | 10/2015 | Coakley | A44B 19/24 223/111 |
| 2016/0012688 | A1 | 1/2016 | Eagleman et al. | |
| 2017/0143057 | A1 * | 5/2017 | Morris-Wilton | A41D 1/06 |
| 2019/0174878 | A1 | 6/2019 | Fernandez Verdú | |
| 2019/0204919 | A1 * | 7/2019 | Gwak | G06F 3/016 |
| 2019/0283247 | A1 * | 9/2019 | Chang | A61B 5/1121 |
| 2019/0310060 | A1 * | 10/2019 | Cahill | A41D 1/04 |
| 2020/0150768 | A1 | 5/2020 | Kim et al. | |
| 2020/0206074 | A1 * | 7/2020 | Ko | A41D 1/04 |
| 2020/0221802 | A1 * | 7/2020 | They | A41D 1/06 |

FOREIGN PATENT DOCUMENTS

| | | | |
|---|---|---|---|
| KR | 10-2019-0054907 A | 5/2019 | |
| KR | 10-2020-0019636 A | 2/2020 | |
| NL | 1023684 C1 | 10/2006 | |
| WO | 2008/070824 A2 | 6/2008 | |
| WO | 2018/220596 A2 | 12/2018 | |
| WO | WO-2018230949 A1 * | 12/2018 | A41D 1/002 |

OTHER PUBLICATIONS

European Search Report corresponding to European Patent Application No. 21903852.8 dated Oct. 8, 2024, 14 pages.

* cited by examiner

TACTILE STIMULUS PROVIDING APPARATUS

This application is a national stage application of PCT/KR2021/018596 filed on Dec. 9, 2021, which claims priority to Korean Patent Application No. 10-2020-0173698 filed on Dec. 11, 2020. The disclosure of each of the foregoing applications is incorporated herein by reference in its entirety.

TECHNICAL FIELD

The present invention relates to a tactile stimulus providing apparatus.

BACKGROUND ART

A tactile stimulus providing apparatus includes actuators and can provide a tactile stimulus to a user by selectively vibrating the actuators. The tactile stimulus providing apparatus can be tailored to various body parts of the target user.

However, the body parts of the user can be used not only to simply feel the tactile stimulus, but can also be used as an input unit for a touch, a motion, and the like. Accordingly, the tactile stimulus providing apparatus should be properly provided in a structure so as not to cause inconvenience to the user's input behavior. In addition, even when the user's input behavior becomes intense, the tactile stimulus providing apparatus should not be separated from the user, and the actuators should be in close contact with a target body part.

In addition, the user may wear the tactile stimulus providing apparatus not only directly on the body part, but also on clothing such as a sock, a glove, and a shoe. Accordingly, a size of the tactile stimulus providing apparatus should be easily changed according to the situation, and the actuators should be in close contact with the target body part.

Technical Problem

One embodiment is directed to providing a tactile stimulus providing apparatus of which a size is easily changed and which is firmly fixed on a user's body part and also does not interfere with a user's input behavior.

Technical Solution

One aspect of the present invention provides a tactile stimulus providing apparatus in a form of a vest, which includes a first front panel including first actuators arranged between one side and the other side, a second front panel including second actuators arranged between one side and the other side, and a rear panel including third actuators and connected to the first front panel and the second front panel, wherein the first front panel further includes a first recess formed to extend along the one side, and the second front panel further includes a second recess formed to extend along the one side.

The tactile stimulus providing apparatus may further include a first detachable member positioned on an inner upper surface of the first recess and a second detachable member positioned on an inner lower surface of the first recess.

The first detachable member and the second detachable member may not be detachably attached to each other.

The tactile stimulus providing apparatus may further include a third detachable member positioned on an inner upper surface of the second recess and a fourth detachable member positioned on an inner lower surface of the second recess.

The third detachable member and the fourth detachable member may not be detachably attached to each other.

The tactile stimulus providing apparatus may further include a locking member of which one side is to be inserted into the first recess and the other side is to be inserted into the second recess.

The locking member may include a fifth detachable member which is positioned on an upper surface of one side and is detachably attached to the first detachable member, a sixth detachable member which is positioned on a lower surface of the one side and is detachably attached to the second detachable member, a seventh detachable member which is positioned on an upper surface of the other side and is detachably attached to the third detachable member, and an eighth detachable member which is positioned on a lower surface of the other side and is detachably attached to the fourth detachable member.

The tactile stimulus providing apparatus may further include a first shoulder strap which connects the first front panel and the rear panel and a first cover layer which covers a part of the first shoulder strap, wherein the first cover layer may be formed of a softer material than that of the first shoulder strap.

The tactile stimulus providing apparatus may further include a first wire extending between the first shoulder strap and the first cover layer and electrically connected to at least one of the first actuators or the third actuators.

The tactile stimulus providing apparatus may further include a first shoulder adjuster and a second shoulder adjuster which are positioned on the first shoulder strap and are detachably attached to each other, wherein the first shoulder adjuster and the second shoulder adjuster may be spaced apart from each other with the first cover layer interposed therebetween.

The tactile stimulus providing apparatus may further include a first waist assembly which connects one side of the rear panel to the other side of the first front panel and a second waist assembly which connects the other side of the rear panel and the other side of the second front panel.

The first waist assembly may include a first waist adjuster, a first front strap of which one end is connected to the other side of the first front panel and the other end is fixed to the first waist adjuster, and a first rear strap of which one end is connected to the one side of the rear panel and the other end is fixed to the first waist adjuster, wherein the first rear strap may have higher elasticity than the first front strap.

Advantageous Effects

A size of a tactile stimulus providing apparatus according to the present invention can be easily changed, and the tactile stimulus providing apparatus can be firmly fixed on a user's body part and also cannot interfere with a user's input behavior.

MODES OF THE INVENTION

Figure 1:
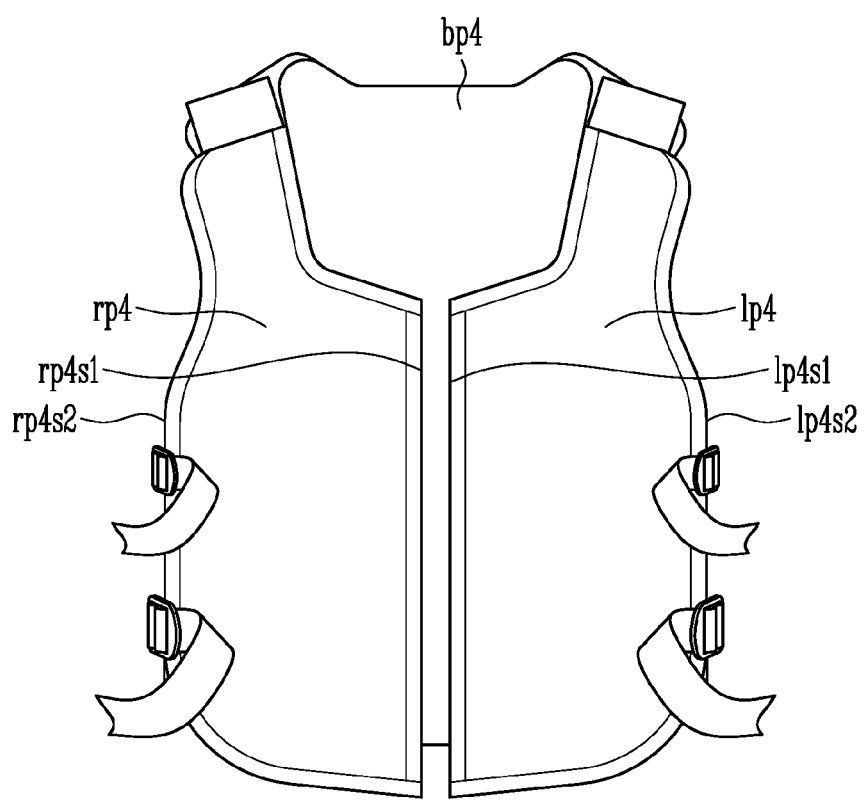
FIG. 1 is a view illustrating a tactile stimulus providing apparatus according to one embodiment of the present invention.

Hereinafter, various embodiments of the present invention will be described in detail with reference to the accompanying drawings in order for those skilled in the art to easily perform the present invention. The present invention may be implemented in several different forms and is not limited to the embodiments described herein.

Parts irrelevant to description are omitted in the drawings in order to clearly describe the present invention, and the same or similar parts are denoted by the same reference numerals throughout this specification. Accordingly, the reference numerals described previously may be used in the other drawings.

Furthermore, since sizes and thicknesses of components in the drawings are arbitrarily illustrated for the sake of convenience in the description, the present invention is not necessarily limited thereto, and the thicknesses of components in the drawings may be exaggeratedly illustrated for clearly expressing various layers and regions.

FIG. 1 is a view illustrating a tactile stimulus providing apparatus according to one embodiment of the present invention.

Referring to FIG. 1, a tactile stimulus providing apparatus 24 according to one embodiment of the present invention is a tactile stimulus providing apparatus in the form of a vest and may include a first front panel lp4, a second front panel rp4, and a rear panel bp4.

The first front panel lp4 may include first actuators arranged between one side lp4$s$1 and the other side lp4$s$2. The second front panel rp4 may include second actuators arranged between one side rp4$s$1 and the other side rp4$s$2. The rear panel bp4 may include third actuators and may be connected to the first front panel lp4 and the second front panel rp4.

Figure 7:
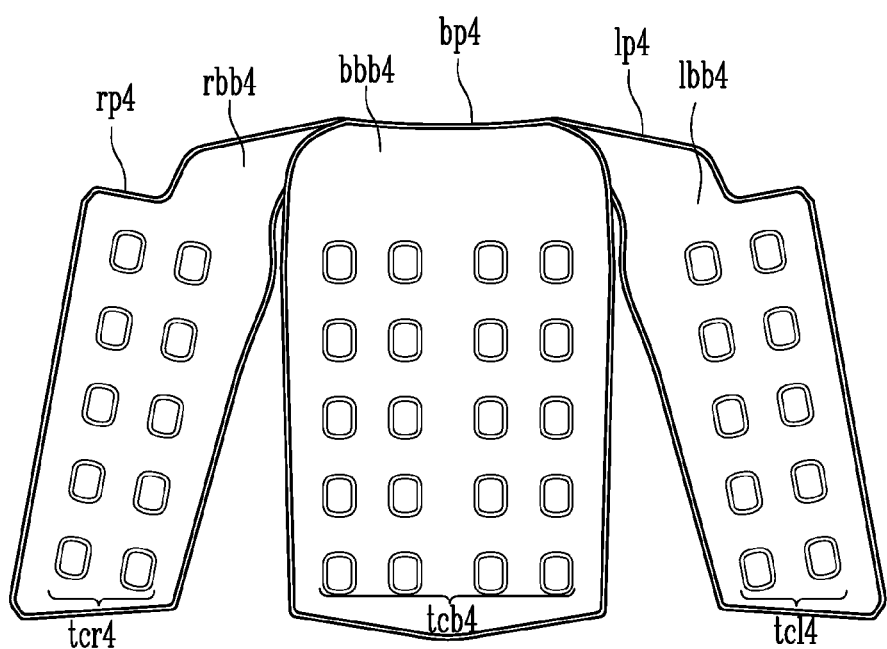
FIG. 7 is a view for describing a case in which linings are removed in a state of FIG. 6.

Each of the panels lp4, rp4, and bp4 may be formed of a plurality of layers, and at least one layer of the plurality of layers may correspond to a base band. The base band may be a member for fixing the actuators. One surface of the base band may be positioned in the panel and is not visible. Referring to FIG. 7, when a lining is removed, the other surface of the base band may be exposed inward.

In FIG. 1, the one side lp4$s$1 of the first front panel lp4 and the one side rp4$s$1 of the second front panel rp4 are not coupled to each other. According to the present embodiment, a locking member (not shown in FIG. 1) capable of coupling the one side lp4$s$1 of the first front panel lp4 and the one side rp4$s$1 of the second front panel rp4 may be detachably attached.

Figure 2:
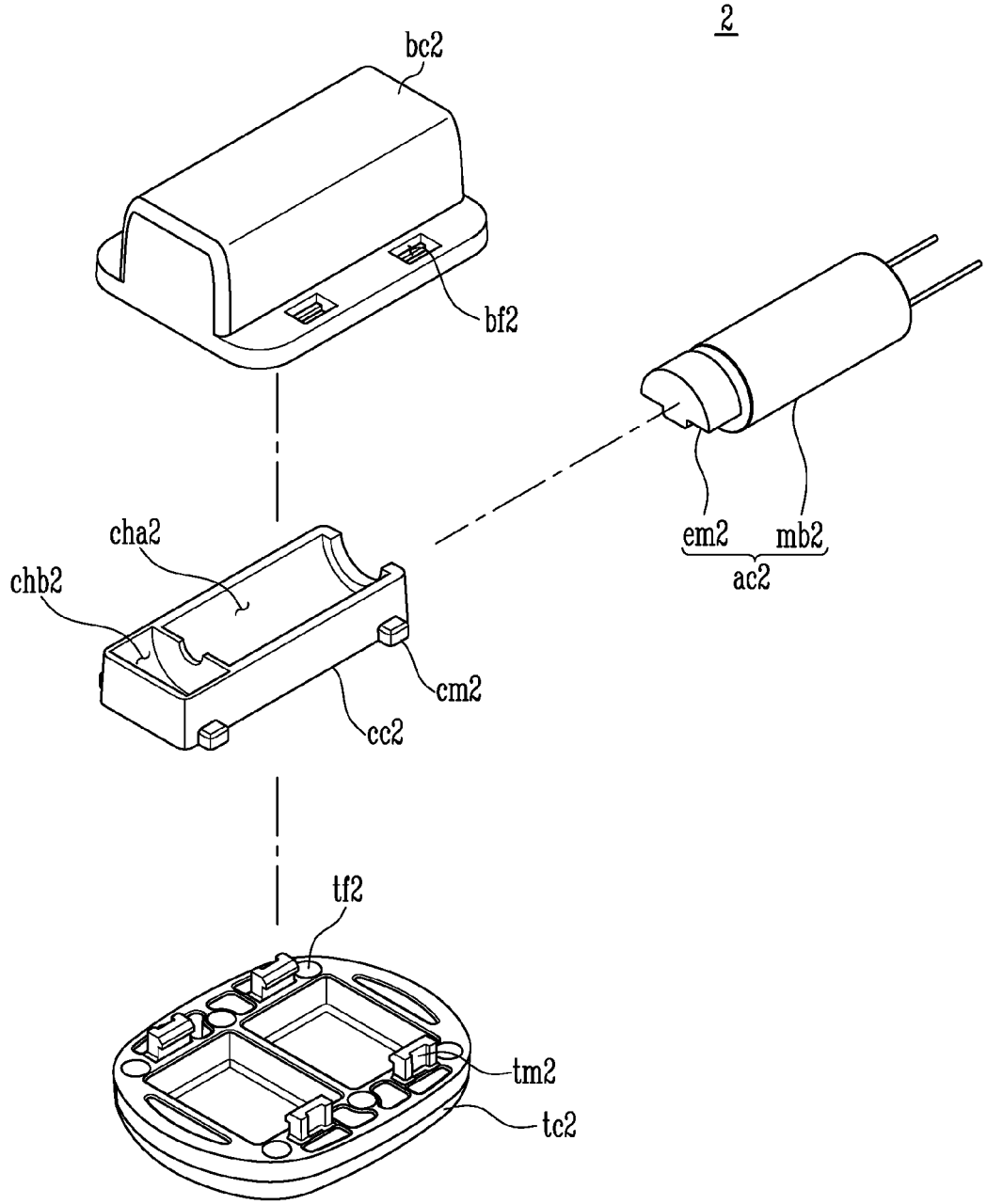
FIGS. 2 and 3 are views for describing an actuator case according to one embodiment of the present invention.
Figure 3:
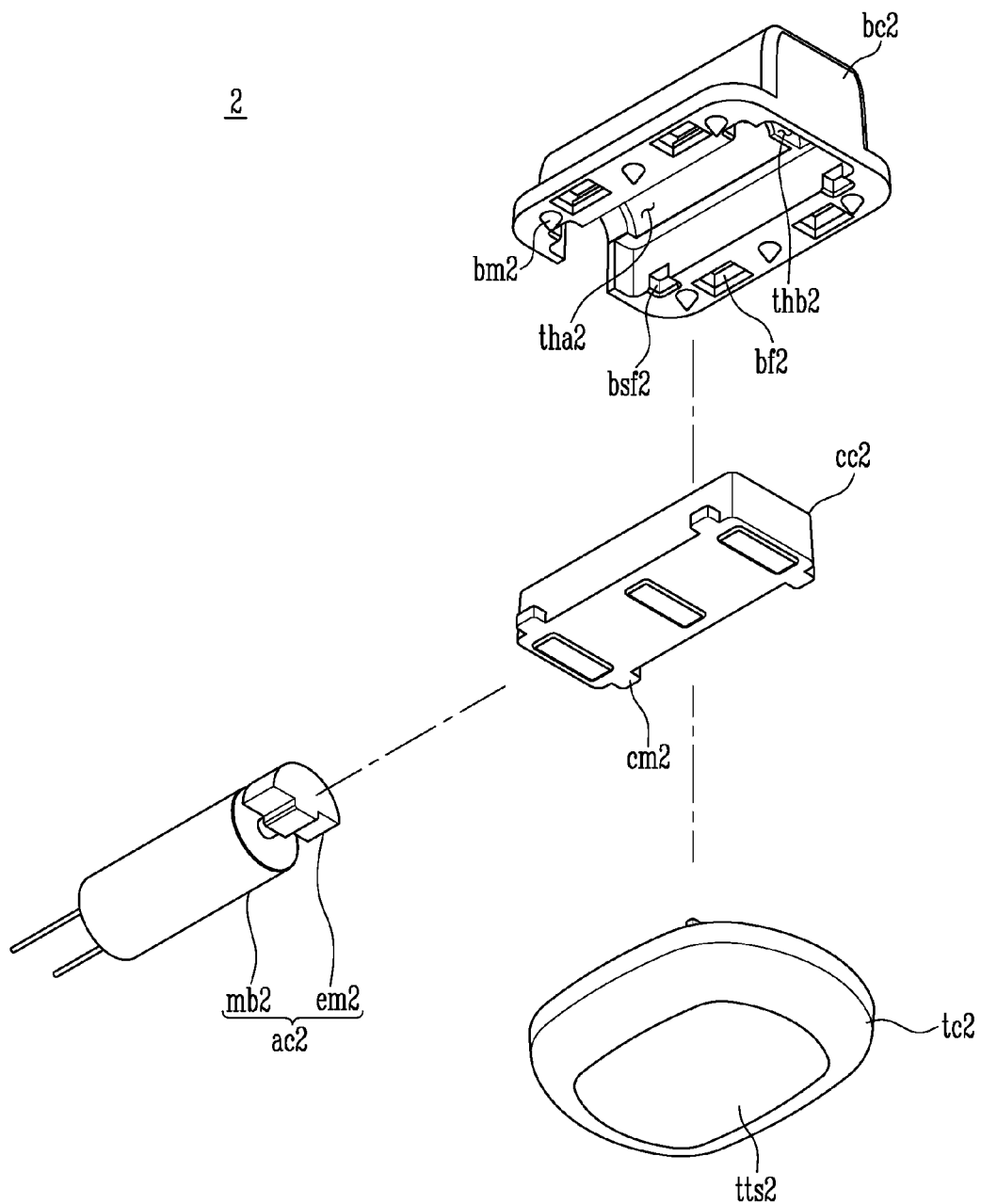

FIGS. 2 and 3 are views for describing an actuator case according to one embodiment of the present invention.

Referring to FIGS. 2 and 3, an actuator case 2 according to one embodiment of the present invention includes a bottom case bc2, a cover case cc2, and a top case tc2.

Positional relationships between the bottom case bc2, the cover case cc2, and the top case tc2 may be determined based on the base band. The base band may be positioned between the cover case cc2 and the top case tc2.

An actuator ac2 is positioned on one surface of the base band and includes a driver mb2 and an eccentric mass body em2. The driver mb2 and the eccentric mass body em2 may be rotatably connected through a shaft. The actuator ac2 may be an eccentric rotation mass (ERM) motor. The actuator ac2 may generate vibrations while the eccentric mass body em2 serving as an unbalanced oscillator is rotated by the driver mb2. The actuator ac2 may be a cylindrical vibration motor in which a diameter of a cylinder is about 6 mm and an overall height is about 17 mm. In a coin-shaped motor, an oscillator rotates horizontally and generates vibrations in a horizontal direction, but the actuator ac2 of the present embodiment may generate vibrations in a vertical direction.

The bottom case bc2 is positioned on one surface of the base band and includes a first accommodation portion tha2 for accommodating the driver mb2 and a second accommodation portion thb2 for accommodating the eccentric mass body em2. That is, the bottom case bc2 may accommodate all or a part of the actuator ac2 not including a wire. According to one embodiment, when the bottom case bc2 accommodates only a part of the actuator ac2, the rest part of the actuator ac2 may be accommodated in the cover case cc2 which will be described below.

The cover case cc2 is positioned on one surface of the base band and coupled to the bottom case bc2 so that the driver mb2 is in close contact with the first accommodation portion tha2.

Referring to FIGS. 2 and 3, the cover case cc2 may be coupled to the bottom case bc2 to cover the actuator ac2. As a male fastener cm2 of the cover case cc2 is fitted into a female fastener bsf2 of the bottom case bc2, the cover case cc2 may be firmly fixed to the bottom case bc2. In particular, the first accommodation portion tha2 and an accommodation portion cha2 may be formed to firmly fix the driver mb2 of the actuator ac2. The male fastener cm2 of the cover case cc2 may protrude to be parallel to a surface at which the cover case cc2 is in contact with the base band. In the present embodiment, the male fastener cm2 and the female fastener bsf2 are provides as four pairs of male fasteners cm2 and female fasteners bsf2, but the number thereof may vary according to an embodiment.

The cover case cc2 may be coupled to the bottom case bc2 to isolate the eccentric mass body em2 from one surface of the base band and also form a free rotating space of the eccentric mass body em2 with the second accommodation portion thb2. That is, an accommodation portion chb2 of the cover case cc2 matches the second accommodation portion thb2 to form the free rotating space which does not interfere with rotation of the eccentric mass body em2. In addition, the accommodation portion chb2 of the cover case cc2 also serves to isolate the eccentric mass body em2 from one surface of the base band. Accordingly, even when the base band is formed of flexible cloth or rubber, the eccentric mass body em2 may rotate reliably without worry of coming into contact with the base band.

The top case tc2 is positioned on the other surface of the base band and fixes the bottom case bc2 to the base band.

A male fastener tm2 of the top case tc2 is coupled to a female fastener bf2 of the bottom case through the base band, and thus the actuator ac2 and the actuator case 2 may be fixed to the base band. In this case, the base band may include an opening having a shape through which the male fastener tm2 may pass. According to one embodiment, an area of the top case tc2 in close contract with the other surface of the base band may correspond to an area of the bottom case bc2 in close contact with one surface of the base band. In this case, since there is a relatively sufficient space for the male fastener tm2 to be positioned, in the present embodiment, the male fastener tm2 and the female fastener bf2 are formed as four pairs of male fasteners tm2 and female fasteners bf2. Accordingly, even when the actuator ac2 vibrates more strongly, the male fasteners tm2 and the female fasteners bf2 can withstand the vibrations. According to the present embodiment, when the area of the top case tc2 corresponds to the area of the bottom case bc2, since a sufficient vibration force is delivered to the back of a relatively less sensitive user, there is an advantage that the user can more clearly feel the vibrations. In addition, in the present embodiment, a corner of one surface of the top case tc2 may be formed to be rounded to provide a more comfortable feeling to the user.

The bottom case bc2 may include a protrusion bm2, and the top case tc2 may include a recess tf2. As the protrusion bm2 of the bottom case bc2 presses the base band and is fitted into the recess tf2, the actuator ac2 and the actuator case 2 may be more firmly fixed to the base band. In the present embodiment, since the area of the top case tc2 is relatively sufficient, six pairs of protrusions bm2 and recesses tf2 are formed to correspond to the area, and thus a sufficient supporting force is provided.

Figure 4:
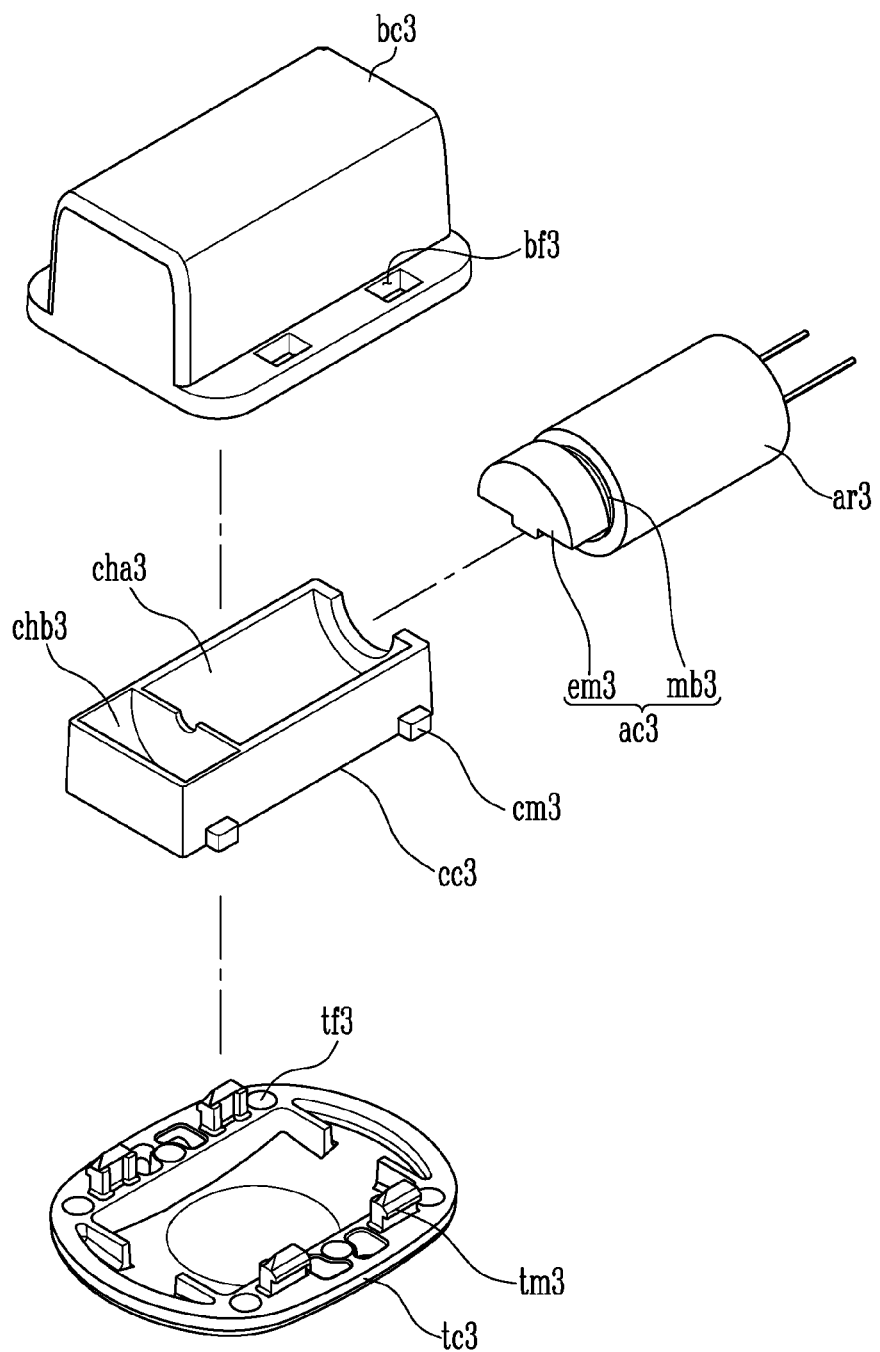
FIGS. 4 and 5 are views for describing an actuator case according to another embodiment of the present invention.
Figure 5:
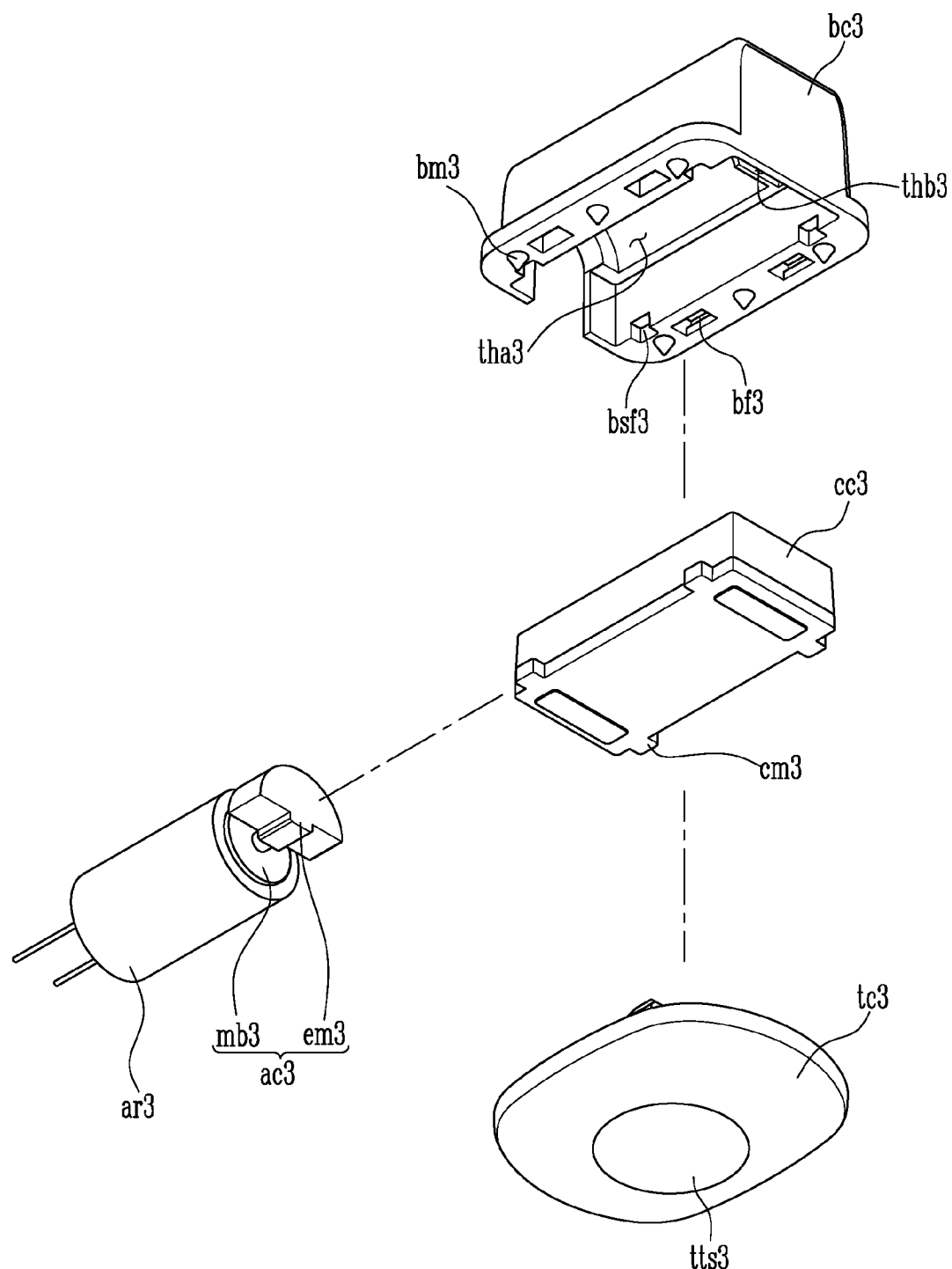

FIGS. 4 and 5 are views for describing an actuator case according to another embodiment of the present invention.

Referring to FIGS. 4 and 5, an actuator case 3 according to another embodiment of the present invention includes a bottom case bc3, a cover case cc3, and a top case tc3.

Position relationships between the bottom case bc3, the cover case cc3, and the top case cc3 may be determined based on a base band. The base band may be positioned between the cover case cc3 and the top case tc3.

An actuator ac3 is positioned on one surface of the base band and includes a driver mb3 and an eccentric mass body em3. The driver mb3 and the eccentric mass body em3 may be rotatably connected through a shaft. The actuator ac3 may be an ERM motor. The actuator ac3 may generate vibrations while the eccentric mass body em3 rotated by the driver mb3 serves as an unbalanced oscillator. The actuator ac3 may be a cylindrical vibration motor in which a diameter of a cylinder is about 6 mm and an overall height is about 17 mm. In a coin-shaped motor, an oscillator rotates horizontally and generates vibrations in a horizontal direction, but the actuator ac3 of the present embodiment may generate vibrations in a vertical direction.

The bottom case bc3 is positioned on one surface of the base band and includes a first accommodation portion tha3 for accommodating the driver mb3 and a second accommodation portion thb3 for accommodating the eccentric mass body em3. That is, the bottom case bc3 may accommodate all or a part of the actuator ac3 not including a wire. According to one embodiment, when the bottom case bc3 accommodates only a part of the actuator ac3, the rest part of the actuator ac3 may be accommodated in the cover case cc3 which will be described below.

The cover case cc3 is positioned on one surface of the base band and is coupled to the bottom case bc2 so that the driver mb3 is in close contact with the first accommodation portion tha3.

Referring to FIGS. 4 and 5, the cover case cc3 may be coupled to the bottom case bc3 to cover the actuator ac3. As a male fastener cm3 of the cover case cc3 is fitted into a female fastener bsf3 of the bottom case bc3, the cover case cc3 may be firmly fixed to the bottom case bc3. In particular, the first accommodation portion tha3 and an accommodation portion cha3 may be formed to firmly fix the driver mb3 of the actuator ac3. The male fastener cm3 of the cover case cc3 may protrude to be parallel to a surface at which the cover case cc3 is in contact with the base band. In the present embodiment, the male fastener cm3 and the female fastener bsf3 are provides as four pairs of male fasteners cm2 and female fasteners bsf2, but the number thereof may vary according to an embodiment.

In the present embodiment, unlike the embodiment of FIGS. 2 and 3, a tactile stimulus providing apparatus 24 may further include an isolator ar3 which covers at least a part the driver mb3 and is interposed between the driver mb3 and the first accommodation portion tha3. For example, the isolator ar3 may have a cylindrical shape surrounding an outer circumferential surface of the driver mb3. In this case, the isolator ar3 may isolator the driver mb3, the first accommodation portion tha3, and the accommodation portion cha3 from each other. The isolator ar3 may be formed of an elastic material such as rubber, silicone, polyurethane, or sponge. Gaps may be generated between the driver mb3, the first accommodation portion tha3, and the accommodation portion cha3 according to a process deviation, and the isolator ar3 prevents noise which may occur due to the process deviation. In addition, the isolator ar3 may also prevent noise which may occur in the actuator ac3 because loads to be vibrated by each actuator ac3 are not uniform.

The cover case cc3 may be coupled to the bottom case bc3 to isolate the eccentric mass body em3 from one surface of the base band and also form a free rotating space of the eccentric mass body em3 with the second accommodation portion thb3. That is, an accommodation portion chb3 of the cover case cc3 matches the second accommodation portion thb3 to form the free rotating space which does not interfere with rotation of the eccentric mass body em3. In addition, the accommodation portion chb3 of the cover case cc3 also serves to isolate the eccentric mass body em3 from one surface of the base band. Accordingly, even when the base band is formed of flexible cloth or rubber, the eccentric mass body em3 may rotate reliably without worry of coming into contact with the base band.

The top case tc3 is positioned on the other surface of the base band and fixes the bottom case bc3 to the base band.

Figure 16:
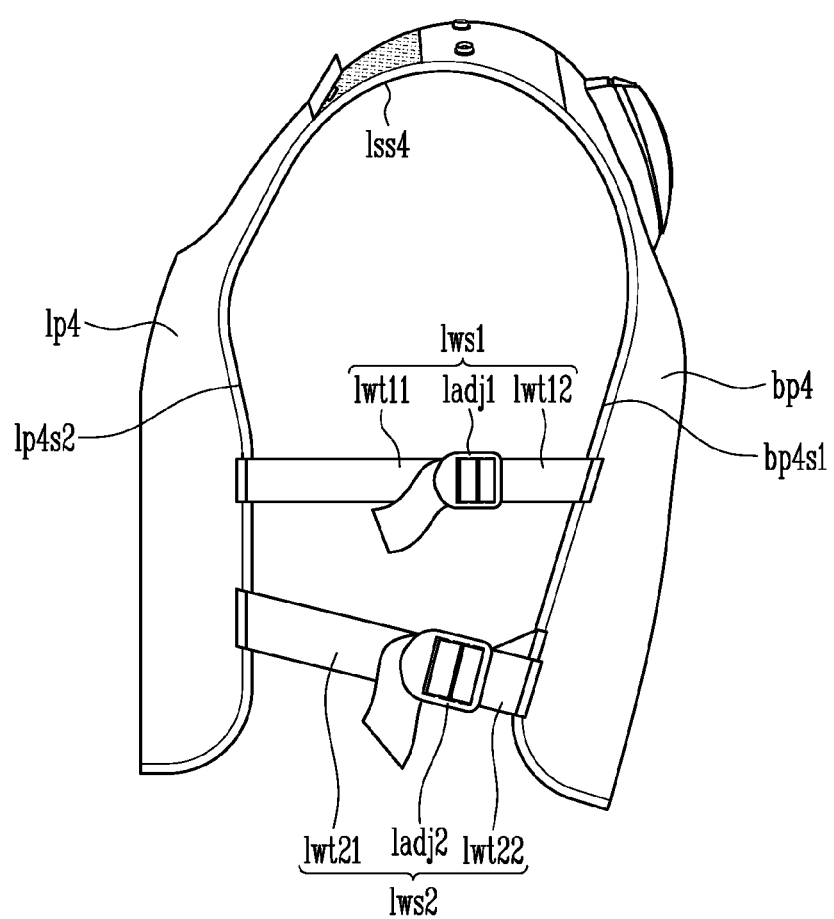
FIGS. 16 and 17 are views for describing a waist assembly according to one embodiment of the present invention.

A male fastener tm3 of the top case tc3 is coupled to a female fastener bf3 of the bottom case bc3 through the base band, and thus the actuator ac3 and the actuator case 3 may be fixed to the base band. In this case, the base band may include an opening having a shape through which the male fastener tm3 may pass. According to the embodiment, an area of a lower surface of the top case tc3 in close contact with the other surface of the base band may correspond to an area of the bottom case bc3 in close contact with one surface of the base band. In this case, since there is a relatively sufficient space for the male fastener tm3 to be positioned, in the present embodiment, the male fastener tm3 and the female fastener bf3 are formed as four pairs of male fasteners tm3 and female fasteners bf3. Accordingly, even when the actuator ac3 vibrates more strongly, the male fasteners tm3 and the female fasteners bf3 can withstand the vibrations. In addition, when compared to an upper surface tts2 of the top case tc2 of FIG. 3, since an area of an upper surface tts3 of the top case tc3 of FIG. 16 is small, a locally concentrated vibration force can be transmitted to a user's body. For example, the top case tc3 may have a truncated cone shape.

The bottom case bc3 may include a protrusion bm3, and the top case tc3 may include a recess tf3. As the protrusion bm3 of the bottom case bc3 presses the base band and is fitted into the recess tf3, the actuator ac3 and the actuator case 3 may be more firmly fixed to the base band. In the present embodiment, since an area of the lower surface of the top case tc3 is relatively sufficient, six pairs of protrusions bm2 and recesses tf2 are formed to correspond to the area, and thus a sufficient supporting force can be provided.

Figure 6:
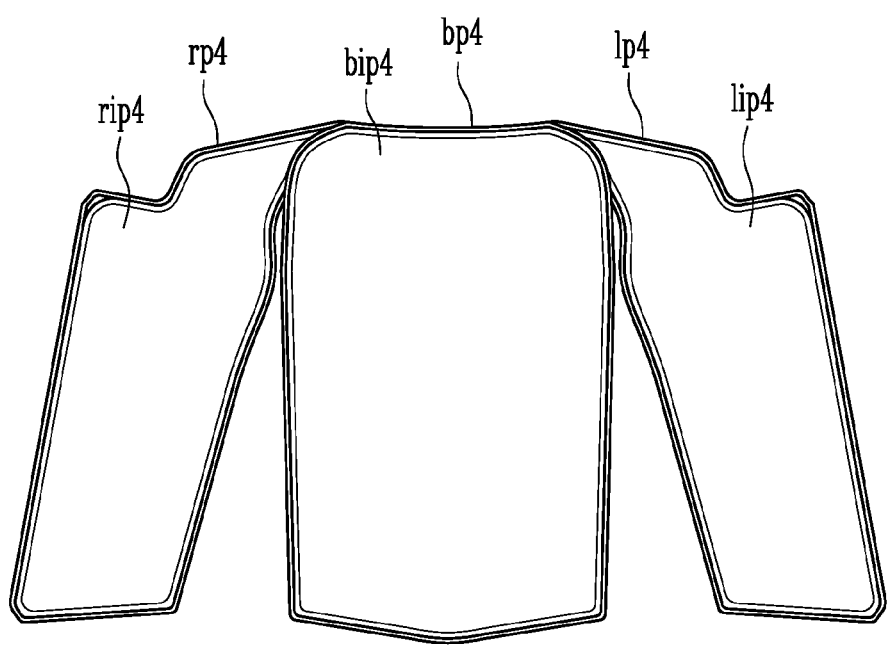
FIG. 6 is a view for describing a case in which the front panels of the tactile stimulus providing apparatus are open.

FIG. 6 is a view for describing a case in which the front panels of the tactile stimulus providing apparatus are open.

Referring to FIG. 6, the tactile stimulus providing apparatus 24 may include a first lining lip4, a second lining rip4, and a third lining bip4.

The first to third linings lip4, rip4, and bip4 may be formed of a waterproof material or may be formed of a high hygroscopic and breathable material such as a mesh.

The first lining lip4 may be positioned on a rear surface of the first front panel lp4. The first lining lip4 may be detachably attached to the rear surface of the first front panel lp4 using a detachable member.

The second lining rip4 may be positioned on a rear surface of the second front panel rp4. The second lining rip4 may be detachably attached to the rear surface of the second front panel rp4 using a detachable member.

The third lining bip4 may be positioned on a front surface of the rear panel bp4. The third lining bip4 may be detachably attached to the front surface of the rear panel bp4 using a detachable member.

A plurality of users can use the tactile stimulus providing apparatus 24 without discomfort by replacing or washing the first to third linings lip4, rip4, and bip4, FIG. 7 is a view for describing a case in which the linings are removed in a state of FIG. 6.

Referring to FIG. 7, a plurality of top cases tcl4 may be arranged on the other surface of a first base band lbb4 of the first front panel lp4. In addition, a plurality of top cases tcr4 may be arranged on the other surface of a second base band rbb4 of the second front panel rp4. In addition, a plurality of top cases tcb4 may be arranged on the side surface of a third base band bbb4 of the rear panel bp4.

Figure 8:
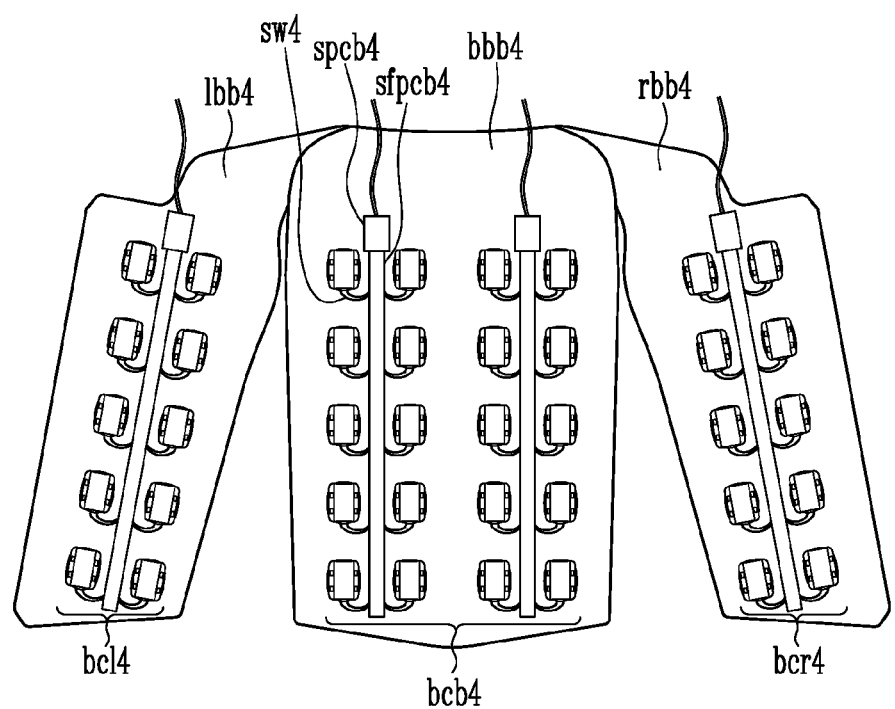
FIG. 8 is a view illustrating one surface of a separated base band in a state of FIG. 7.

FIG. 8 is a view illustrating one surface of the separated base band in a state of FIG. 7.

Referring to FIG. 8, for the sake of ease in the description, the base bands lbb4, rbb4, and bbb4 are separated from the tactile stimulus providing apparatus 24, and one surfaces of the base bands lbb4, rbb4, and bbb4 are illustrated.

First bottom cases bcl4 may be arranged on one surface of the first base band lbb4 to cover the first actuators. Second bottom cases bcr4 may be arranged on one surface of the second base band rbb4 to cover the second actuators. The third bottom cases bcb4 may be arranged on one surface of the third base band bbb4 to cover the third actuators.

The plurality of cover cases (not shown) may be positioned between the plurality of top cases tcl4, tcr4, and tcb4 and the plurality of bottom cases bcl4, bcr4, and bcb4. The plurality of actuators (not shown) may be positioned between the plurality of cover cases and the plurality of bottom cases bcl4, bcr4, and bcb4.

Each actuator may require at least two or three channels (that is, wires) to receive a ground voltage, a driving voltage, a control signal, and the like. However, when each of the plurality of actuators used in the tactile stimulus providing apparatus is connected to a controller, the number of wires may become very large, and the wires may be easily damaged. A rigid wire cover may be inserted to prevent the damage to the wires, but the user may feel uncomfortable.

Accordingly, in the present embodiment, the plurality of actuators are grouped, and one group of the actuators may be electrically connected to one sub-flexible printed circuit board (FPCB) sfpcb4 through wires sw4, and each sub-FPCB sfpcb4 may be electrically connected to a corresponding sub-printed circuit board (PCB)spcb4. The sub-PCB spcb4 may be connected to a controller through a wire. The sub-PCB spcb4 may communicate with the controller through the wire in a method of recommended standard RS232, universal serial bus (USB), inter-integrated circuit (I2C), serial peripheral interface (SPI), or the like. In addition, the sub-PCB spcb4 may wirelessly communicate with the controller in a method of Bluetooth, WiFi, ZigBee, or the like. Accordingly, according to the present embodiment, even when a large number of actuators are used, a wiring structure can be simplified.

Figure 9:
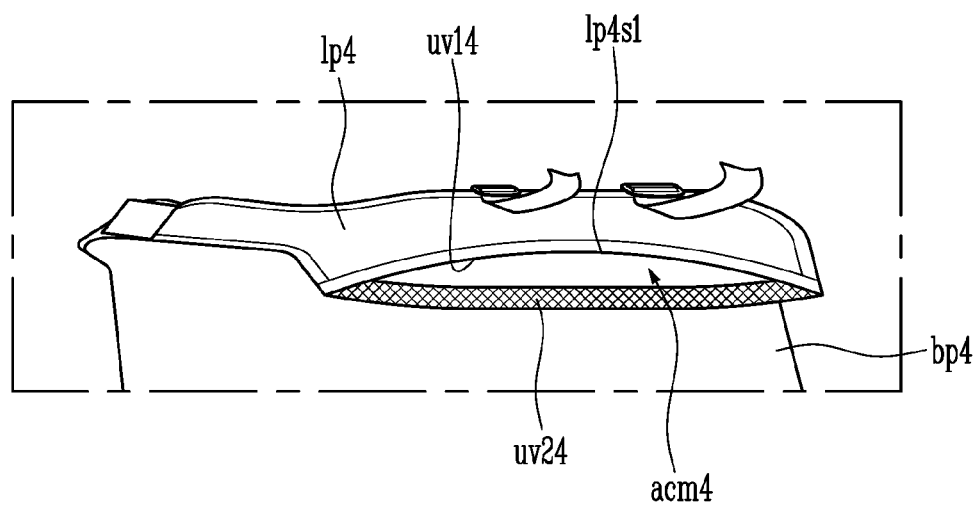
FIG. 9 is a view for describing a recess of a front panel.

FIG. 9 is a view for describing a recess of the front panel.

Referring to FIG. 9, the first front panel lp4 may include a first recess acm4 formed to extend along the one side lp4s1. A length of the first recess acm4 may be substantially the same as a length of the one side lp4s1 of the first front panel lp4.

A first detachable member uv14 may be positioned on an inner upper surface of the first recess acm4. A second detachable member uv24 may be positioned on an inner lower surface of the first recess acm4. A length of the first detachable member uv14 may be substantially the same as a length of the second detachable member uv24. In addition, a length of each of the first and second detachable members uv14 and uv24 may be substantially the same as the length of the one side lp4s1 of the first front panel lp4.

For example, each of the first detachable member uv14 and the second detachable member uv24 may be a detachable member of A type. In the present embodiment, the detachable member may be a detachable member of any one of A type and B type. A type and B type may be detachably attached to each other. However, A type and A type may not be detachably attached to each other. Similarly, B type and B type may not be detachably attached to each other. Any detachable member of any type having such types may be used as the detachable members of the present embodiment. Such detachable members may be, for example, Velcro, magnets, electromagnets, snap buttons, and the like. In the drawings of the following embodiments, it is assumed that the detachable member is Velcro.

In the present embodiment, the first detachable member uv14 and the second detachable member uv24 may be easily inserted into the first recess acm4 because of not being detachably attached to each other.

Although not illustrated in the drawing, the above description may be equally applied to a second recess of the second front panel rp4. For example, the second front panel rp4 may include the second recess formed to extend along the one side rp4s1. A third detachable member may be positioned on an inner upper surface of the second recess. A fourth detachable member may be positioned on an inner lower surface of the second recess. The third detachable member and the fourth detachable member may not be detachably attached to each other.

Figure 10:
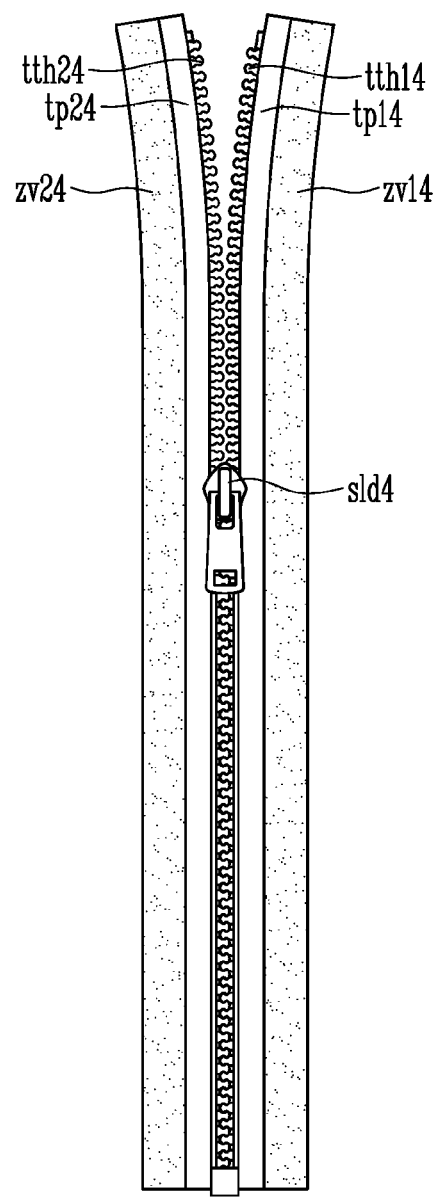
FIGS. 10 and 11 are views for describing a replaceable locking member according to one embodiment of the present invention.
Figure 11:
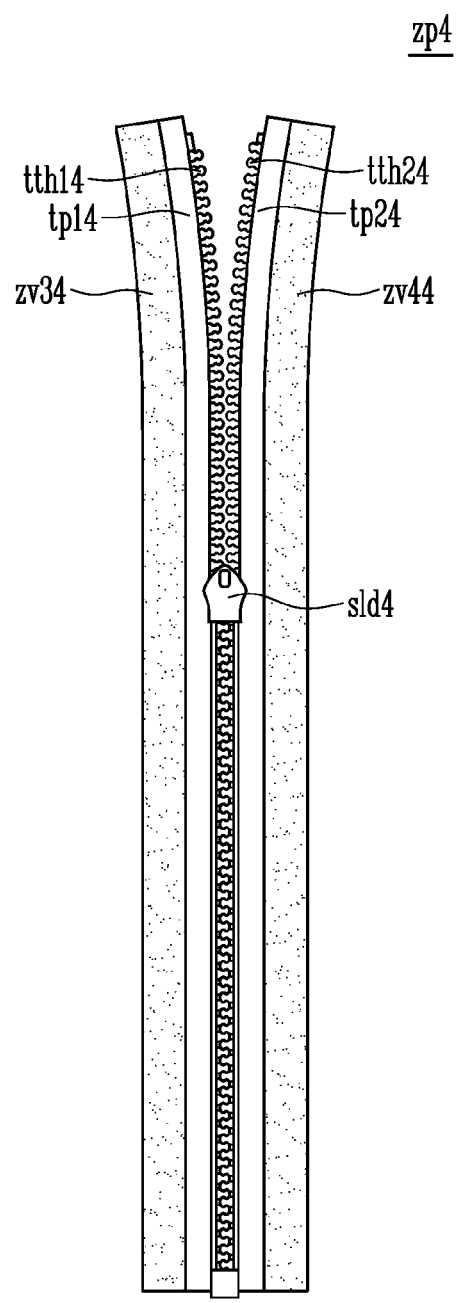

FIGS. 10 and 11 are views for describing a replaceable locking member according to one embodiment of the present invention. FIG. 10 is a front view illustrating a locking member zp4, and FIG. 11 is a rear view illustrating the locking member zp4.

For example, the locking member zp4 may be a replaceable zipper. Since a required area of the zipper is small, the front panels lp4 and rp4 may accommodate many actuators, and thus there is an advantage that a more realistic and rich tactile stimulus can be delivered. In addition, since an exterior of the zipper may be clearly finished, the zipper is adopted as a lock in many garments.

An existing zipper has disadvantages of weak durability and a difficulty in replacement. The zipper may be easily broken when a user fits the zipper in a wrong way, pulls the zipper with a too large force in a wrong direction, or the like. In particular, when a belly comes out or bends due to bending of a waist, the zipper may be easily broken when forcibly pulling the zipper with a large force. Conventionally, in order to replace a broken zipper, there are difficulties in tearing off a sewn part of the zipper, removing the zipper, and sewing the zipper again. In addition, even when the zipper is replaced as described above, there are disadvantages that needle marks are left on an exterior, durability of a connection part between the sewn part and the zipper is weakened, and thus the zipper may be more easily separated from the sewn part. When buttons are used instead of the zipper, it may take a long time to wear and be difficult to take off. When a buckle is used instead of the zipper, an area occupied by the buckle is too large, and thus there is a disadvantage in an exterior and a haptic sensation.

The locking member zp4 may include a slider sld4 which is a basic zipper component, teeth tth14 at one side, a tape tp14 at one side for fixing the teeth tth14, teeth tth24 at the other side, and a tape tp24 at the other side for fixing the teeth tth24.

According to the present embodiment, the locking member zp4 may be formed so that one side is to be inserted into the first recess acm4 and the other side is to be inserted into the second recess. According to one embodiment, the locking member zp4 may further include detachable members zv14, zv24, zv34, and zv44.

A fifth detachable member zv14 may be positioned on an upper surface of one side of the locking member zp4 and detachably attached to the first detachable member uv14. The fifth detachable member zv14 may be a detachable member of B type. The fifth detachable member zv14 may be sewn to an upper surface of the tape tp14. A length of the fifth detachable member zv14 may be substantially the same as a length of the tape tp14.

A sixth detachable member zv34 may be positioned on a lower surface of one side of the locking member zp4 and detachably attached to the second detachable member uv24. The sixth detachable member zv34 may be a detachable member of B type. The sixth detachable member zv34 may be sewn to a lower surface of the tape tp14. A length of the sixth detachable member zv34 may be substantially the same as the length of the tape tp14.

A seventh detachable member zv24 may be positioned on an upper surface of the other side of the locking member zp4 and detachably attached to the third detachable member. The seventh detachable member zv24 may be a detachable member of B type. The seventh detachable member zv24 may be sewn to an upper surface of the tape tp24. A length of the seventh detachable member zv24 may be substantially the same as a length of the tape tp24.

An eighth detachable member zv44 may be positioned on a lower surface of the other side of the locking member zp4 and detachably attached to the fourth detachable member. The eighth detachable member zv44 may be a detachable member of B type. The eighth detachable member zv44 may be sewn to a lower surface of the tape tp24. A length of the eighth detachable member zv44 may be substantially the same as the length of the tape tp24.

Figure 12:
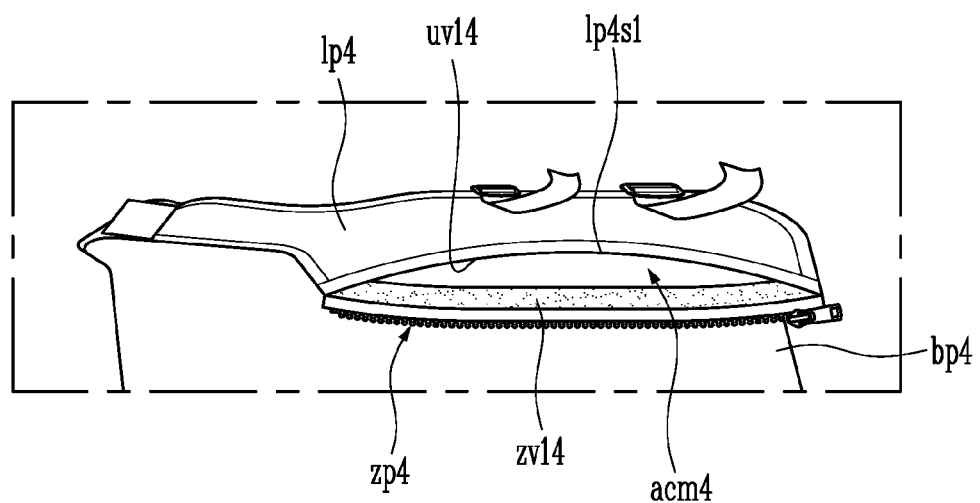
FIGS. 12 and 13 are views for describing a state in which the locking member is mounted on the recess of the front panel.
Figure 13:
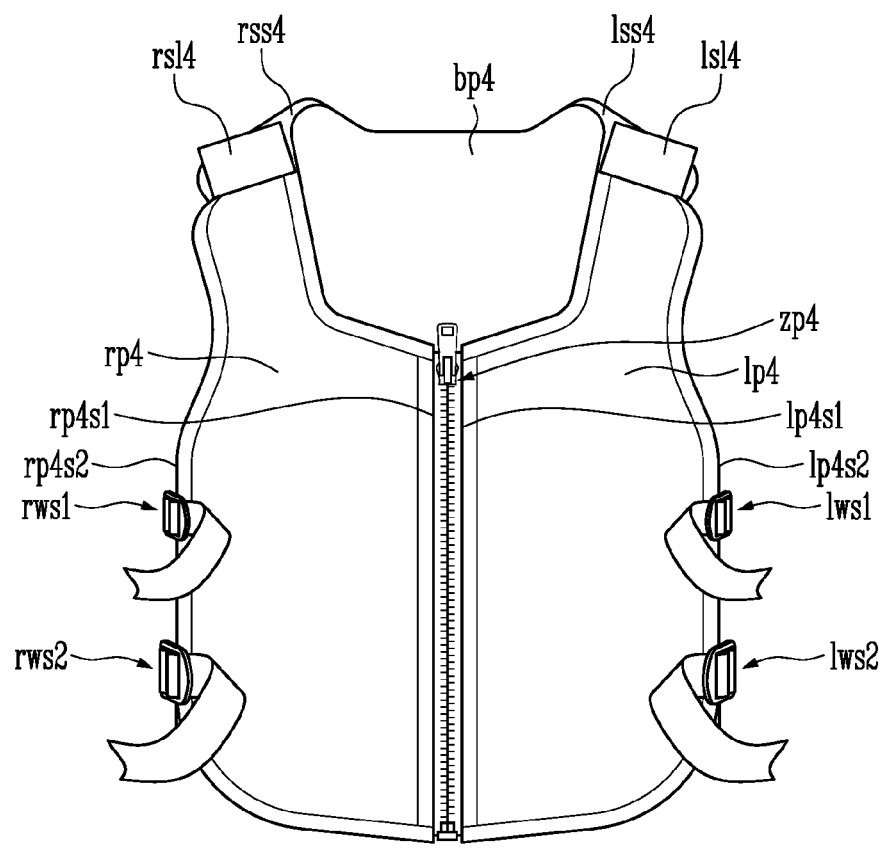

FIGS. 12 and 13 are views for describing a state in which the locking member is mounted on the recess of the front panel.

Referring to FIG. 12, an example of a state in which the second detachable member uv24 and the sixth detachable member zv34 are attached is illustrated. As the first detachable member uv14 and the fifth detachable member zv14 are further attached, the locking member zp4 and the first recess acm4 may be completely coupled.

Referring to FIG. 13, an example of a state in which the detachable members zv14, zv24, zv34, and zv44 of the locking member zp4 are attached to the first to fourth detachable members of the first recess acm4 and the second recess is illustrated. Accordingly, the one side lp4s1 of the first front panel lp4 and the one side rp4s1 of the second front panel rp4 may be coupled to each other using the locking member zp4.

According to the present embodiment, there are advantages that the locking member zp4, which may be easily broken, can be easily replaced, and the user can easily select a desired color/type of the locking member zp4.

Hereinafter, a first shoulder strap lss4, a first protruding strap lsl4, a second shoulder strap rss4, and a second protruding strap rsl4 will be described with reference to FIGS. 14 and 15. The first shoulder strap lss4 may connect the first front panel lp4 and the rear panel bp4. One end of the first protruding strap lsl4 may be sewn to a part of the first shoulder strap lss4. The second shoulder strap rss4 may connect the second front panel rp4 and the rear panel bp4. One end of the second protruding strap rsl4 may be sewn to a part of the second shoulder strap rss4.

Waist assemblies lws1, lws2, rws1, and rws2 will be described with reference to FIGS. 16 and 17. A first waist assembly lws1 may connect one side of the rear panel bp4 and the other side lp4s2 of the first front panel lp4. A second waist assembly rws1 may connect the other side of the rear panel bp4 and the other side rp4s2 of the second front panel rp4. According to one embodiment, a third waist assembly lws2 may connect one side of the rear panel bp4 and the other side lp4s2 of the first front panel lp4. According to one embodiment, a fourth waist assembly rws2 may connect the other side of the rear panel bp4 and the other side rp4s2 of the second front panel rp4.

Figure 14:
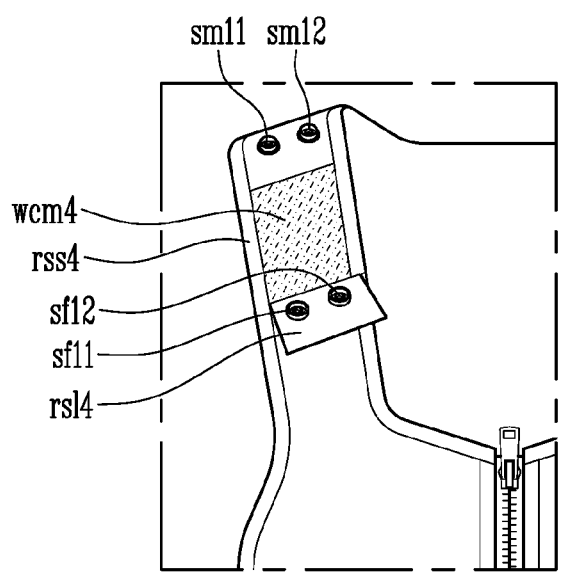
FIGS. 14 and 15 are views for describing a shoulder strap, a cover layer, and a shoulder adjuster according to one embodiment of the present invention.
Figure 15:
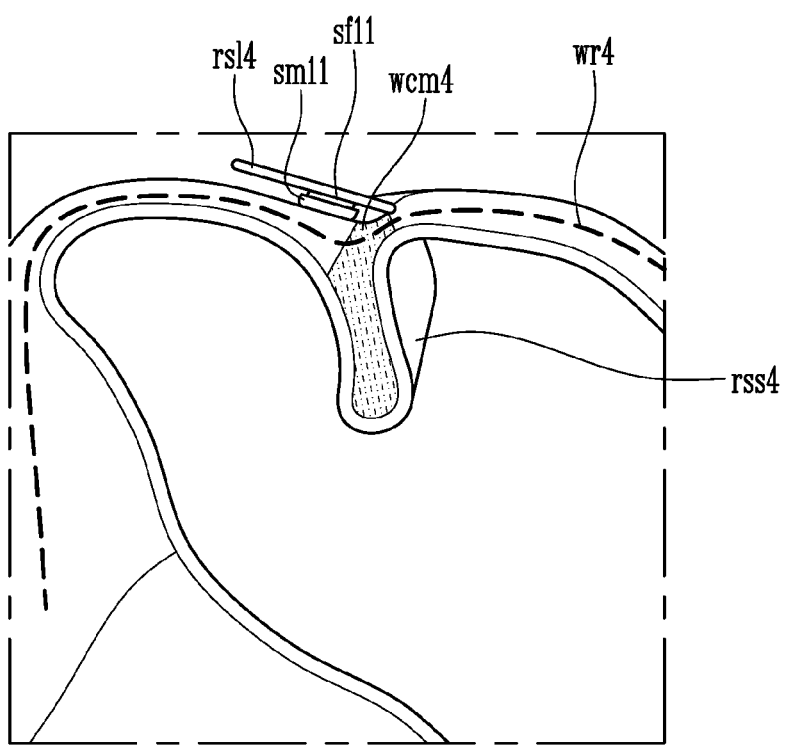

FIGS. 14 and 15 are views for describing a shoulder strap, a cover layer, and a shoulder adjuster according to one embodiment of the present invention.

A second cover layer wcm4 may cover apart of the second shoulder strap rss4. In this case, the second cover layer wcm4 may be formed of a softer material than that of the second shoulder strap rss4. For example, the second cover layer wcm4 may be formed of a thin fabric such as a mesh.

A second wire wr4 may extend between the second shoulder strap rss4 and the second cover layer wcm4 and may be electrically connected to at least one of the second actuators or the third actuators. For example, when the controller of the first to third actuators is positioned on the rear panel bp4, the second wire wr4 may electrically connect the second actuators of the second front panel rp4 and the controller. Meanwhile, when the controller of the first to third actuators are positioned on the second front panel rp4, the second wire wr4 may electrically connect the third actuators of the rear panel bp4 and the controller.

A fifth shoulder adjuster sm11 may be positioned on the second shoulder strap rss4. A sixth shoulder adjuster sf11 may be positioned on the second protruding strap rsl4 on the second shoulder strap rss4. The fifth shoulder adjuster sm11 and the sixth shoulder adjuster sf11 may be detachably attached to each other. For example, the sixth shoulder adjuster sf11 and the fifth shoulder adjuster sm11 may correspond to a male and a female of snap buttons, respectively. The fifth and sixth shoulder adjusters sm11 and sf11 may be spaced apart from each other with the second cover layer wcm4 interposed therebetween. According to the embodiment, a seventh shoulder adjuster sm12 and an eighth shoulder adjuster sf12 may be formed similarly to the fifth shoulder adjuster sm11 and the sixth shoulder adjuster sf11, respectively.

Referring to FIG. 15, a state in which the fifth shoulder adjuster sm11 and the sixth shoulder adjuster sf11 are fastened to each other is illustrated.

When a user's physique is small, the user may fasten the fifth shoulder adjuster sm11 and the sixth shoulder adjuster sf11 so that the tactile stimulus providing apparatus 24 is in close contact with the body. In this case, when the second shoulder strap rss4 and the second wire wr4 are fixed to each other, as the second shoulder strap rss4 is bent, the second wire wr4 is bent, and thus there is a risk of damage to the second wire wr4. However, in the present embodiment, the second wire wr4 may move freely so that a force is distributed in a free space between the second shoulder strap rss4 and the second cover layer wcm4, and thus there is an advantage of reducing the risk of damage to the second wire wr4.

In addition, since the second protruding strap rsl4 may hide the fastening state of the fifth shoulder adjuster sm11 and the sixth shoulder adjuster sf11, the aesthetics of the tactile stimulus providing apparatus 24 can be improved.

Although FIGS. 14 and 15 are illustrated based on the second shoulder strap rss4, since the same structure may be applied based on the first shoulder strap lss4, the repeated descriptions about the first shoulder strap lss4, a first protruding strap lss4, a first cover layer, a first wire, and first to fourth shoulder adjusters will be omitted.

Figure 17:
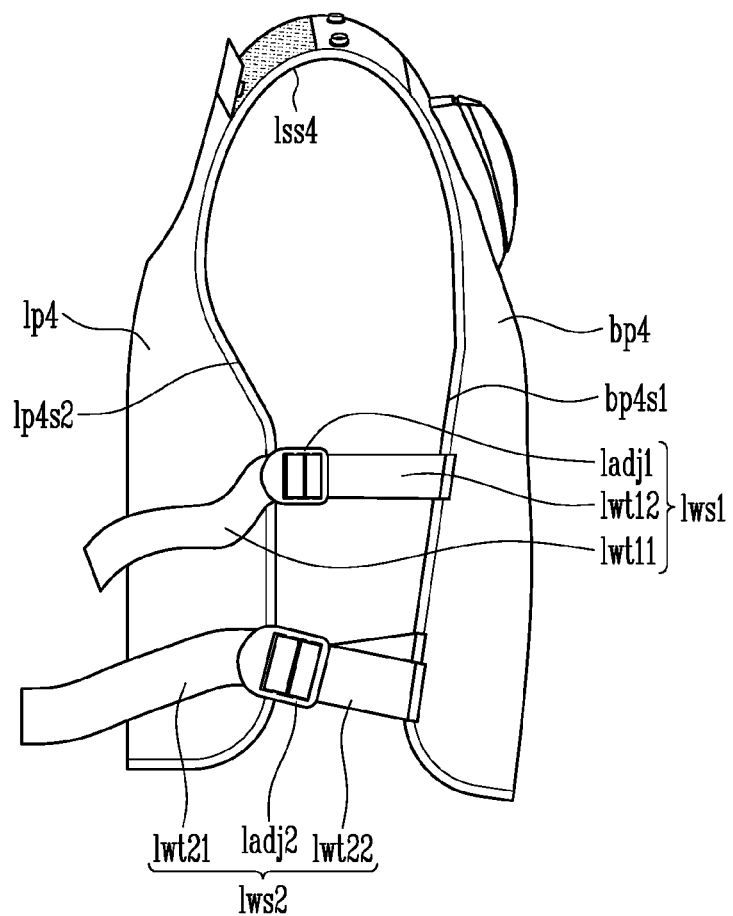

FIGS. 16 and 17 are views for describing a waist assembly according to one embodiment of the present invention.

The first waist assembly lws1 may include a first waist adjuster ladj1, a first front strap lwt11, and a first rear strap lwt12. For example, the first waist adjuster ladj1 may be a web adjuster.

One end of the first front strap lwt11 may be connected to the other side lp4s2 of the first front panel lp4, and the other end may be fixed to the first waist adjuster ladj1. One end of the first rear strap lwt12 may be connected to the one side bp4s1 of the rear panel bp4, and the other end may be fixed to the first waist adjuster ladj1.

In this case, the first rear strap lwt12 may have higher elasticity than the first front strap lwt11. For example, the first front strap lwt11 may be provided as a webbing strap, and the first rear strap lwt22 may be provided as an elastic band. Referring to FIG. 17, when the user pulls the first front strap lwt11 so that the tactile stimulus providing apparatus 24 is in close contact with the user's body, the first rear strap lwt22 is stretched, and thus the first waist adjuster ladj1 may be positioned closer to the first front panel lp4 than the rear panel bp4. Accordingly, there is an advantage that the user can adjust the first waist adjuster ladj1 more conveniently.

Since such descriptions may also be equally applied to the third waist assembly lws2, a third front strap lwt21, a third waist adjuster ladj2, and the third rear strap lwt22, the repeated descriptions will be omitted.

In addition, since such descriptions may also be equally applied to the second waist assembly rws1, a second front strap, a second waist adjuster, and a second rear strap, the repeated descriptions will be omitted. In addition, since such descriptions may also be equally applied to the fourth waist assembly rws2, a fourth front strap, a fourth waist adjuster, and a fourth rear strap, the repeated descriptions will be omitted.

The above reference drawings and the detailed description of the present invention are merely examples of the present invention and are used to only describe the present invention and not to limit the meanings or the scope of the present invention defined by the claims. Therefore, it will be understood by those skilled in the art that various modifications and equivalent other embodiments may be formed. Therefore, the technical scope of the present invention should be defined by the technical spirit of the appended claims.

The invention claimed is:

1. A tactile stimulus providing apparatus in a form of a vest, comprising:
    a first front panel including first actuators arranged between a first side of the first front panel and a second side of the first front panel;
    a second front panel including second actuators arranged between a first side of the second front panel and a second side of the second front panel;
    a rear panel including third actuators and connected to the first front panel and the second front panel;
    a first shoulder strap which connects the first front panel and the rear panel;
    a first cover layer which covers a part of the first shoulder strap;
    a first wire extending between the first shoulder strap and the first cover layer and electrically connected to at least one of the first actuators or the third actuators; and
    a first shoulder adjuster and a second shoulder adjuster which are positioned on the first shoulder strap and are detachably attached to each other,
    wherein the first cover layer is formed of a softer material than that of the first shoulder strap,
    wherein the first shoulder adjuster and the second shoulder adjuster are spaced apart from each other with the first cover layer interposed therebetween, and
    wherein, when the first shoulder adjuster and the second shoulder adjuster are attached to each other, a free space allowing a movement of the first wire is formed between the first shoulder strap and the first cover layer.

2. The tactile stimulus providing apparatus of claim 1,
    wherein the first front panel further includes a first recess formed to extend along the first side of the first front panel,
    wherein the second front panel further includes a second recess formed to extend along the first side of the second front panel, and
    wherein the tactile stimulus providing apparatus further comprises:
    a first detachable member positioned on an inner upper surface of the first recess; and
    a second detachable member positioned on an inner lower surface of the first recess.

3. The tactile stimulus providing apparatus of claim 2, wherein the first detachable member and the second detachable member are not detachably attached to each other.

4. The tactile stimulus providing apparatus of claim 2, further comprising:
   a third detachable member positioned on an inner upper surface of the second recess; and
   a fourth detachable member positioned on an inner lower surface of the second recess.

5. The tactile stimulus providing apparatus of claim 4, wherein the third detachable member and the fourth detachable member are not detachably attached to each other.

6. The tactile stimulus providing apparatus of claim 4, further comprising a locking member of which a first side is to be inserted into the first recess and a second side is to be inserted into the second recess.

7. The tactile stimulus providing apparatus of claim 6, wherein the locking member includes:
   a fifth detachable member which is positioned on an upper surface of the first side of the locking member and is detachably attached to the first detachable member;
   a sixth detachable member which is positioned on a lower surface of the first side of the locking member and is detachably attached to the second detachable member;
   a seventh detachable member which is positioned on an upper surface of the second side of the locking member and is detachably attached to the third detachable member; and
   an eighth detachable member which is positioned on a lower surface of the second side of the locking member and is detachably attached to the fourth detachable member.

8. The tactile stimulus providing apparatus of claim 1, further comprising:
   a first waist assembly which connects a first side of the rear panel to the second side of the first front panel; and
   a second waist assembly which connects a second side of the rear panel and the second side of the second front panel.

9. The tactile stimulus providing apparatus of claim 8, wherein the first waist assembly includes:
   a first waist adjuster;
   a first front strap of which a first end is connected to the second side of the first front panel and a second end is fixed to the first waist adjuster; and
   a first rear strap of which a first end is connected to the first side of the rear panel and a second end is fixed to the first waist adjuster,
   wherein the first rear strap has higher elasticity than the first front strap.

* * * * *